Feb. 26, 1929.   1,703,085

O. A. ANKERSMIT

MEASURING APPARATUS

Filed Jan. 11, 1926

Inventor.
Otto Arnold Ankersmit
By
Attorneys

Patented Feb. 26, 1929.

1,703,085

UNITED STATES PATENT OFFICE.

OTTO ARNOLD ANKERSMIT, OF DELFT, NETHERLANDS.

MEASURING APPARATUS.

Application filed January 11, 1926, Serial No. 80,606, and in Germany January 17, 1925.

My invention relates to measuring systems which, though their use is not restricted thereto, are especially useful in electric instruments.

In modern electric measuring instruments, the force exerted on a movable electric conductor by an electric, magnetic or electromagnetic field is made use of in different ways, and the classification of certain kinds of electromagnetic instruments is based on the form and mounting of the movable conductor and the kind of the field used. Thus, galvanometric instruments can be divided in four groups, coil-galvanometers, string galvanometers, electro-dynamometers and oscillographs.

Although perhaps better adapted for the measurement of direct currents, coil-galvanometers can be used for measuring alternating currents if the construction of the coil is carried out in a suitable manner, and the string galvanometer likewise can be used for measuring alternating current.

The object of the present invention is to improve the string-galvanometer in order to make it better adapted for alternating-current measurements by applying the principle of resonance.

In order to apply the principle of resonance to the string-galvanometer, the string is asymmetrically loaded with a small mass whereby rotational movement of the string is obtained. By suitably choosing the mass of this load, and the length, the tension and the material of the string, this system can be tuned up to a given frequency. The influence of the small mass lies principally in that the damping is reduced and therefore the resonance improved.

According to the invention, the small body forming the loading mass can be used to make the motion of the string visible or in some other manner observable.

For this purpose the small body is asymmetrically attached to the string and provided with a reflecting surface so as to form a mirror. By applying the small body asymmetrically to the string, the motion of the string causes it to rotate on an imaginary axis under the influence of inertia.

Since it is not always advantageous to provide a low damping, means may be provided for changing the damping of the loaded string. It is to be understood that such well known features as liquid damping, tensioning of the string or controlling of the strength of the electromagnetic field may be applied to a galvanometer in which my system is used for the purpose of controlling the period of vibration of the vibrating element. Because such features are well known in the art they have not been illustrated in the drawings and are not considered to form any essential part of the present invention, which is directed to the asymmetric loading of the string for the purpose specified.

In the drawings are illustrated in Figs. 1–4 inclusive examples of the invention.

Figure 1:
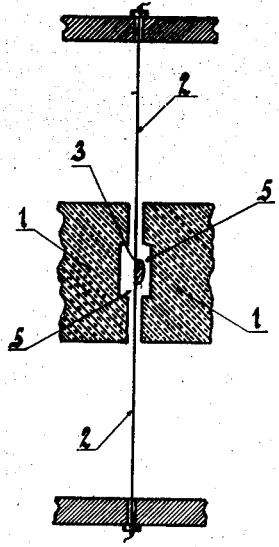
Fig. 1 represents a string asymmetrically loaded in accordance with the invention.

In Fig. 1 a measuring system is represented diagrammatically, the tensioned string 2 is asymmetrically loaded by the mass 3 and is positioned between the faces of the pole shoes 1. In order to allow the mass to move freely between the pole shoes 1 they are provided with slots 5.

Figure 2:
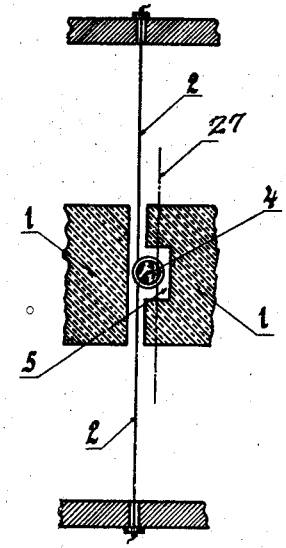
Fig. 2 is a string loaded with a mirror.

In Fig. 2 a measuring system is represented diagrammatically wherein the loaded mass is constituted by a plane mirror 4 which has its plane approximately perpendicular to the lines of force. The distance between the pole shoes is very small in order to obtain the strongest possible magnetic field and one of the pole shoes is provided with a recess or slot 5 wherein the mirror can move freely and whereby observation can be made possible. As soon as a current is passed through the string the latter will tend to move in a direction perpendicular to the lines of force.

Figure 3:
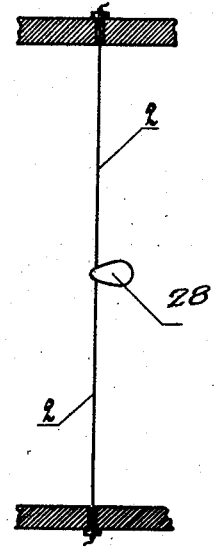
Figs. 3 and 4 show other forms of the body applied to the string.

Due to its own inertia the mirror rotates about an imaginary axis 27 and this motion can be used to reflect a beam of light which becomes visible in the form of a luminous band the length of which is directly proportional to the amplitude of movement of the string. Instead of a mirror, a very thin pointer (not shown) may be attached to the string and the motion thereof observed with a microscope. In Fig. 3 a small wing 28 is fixed to the string. At one end, the wing moves with the string, while it is retarded at the other end so that a rotary motion results.

Figure 4:
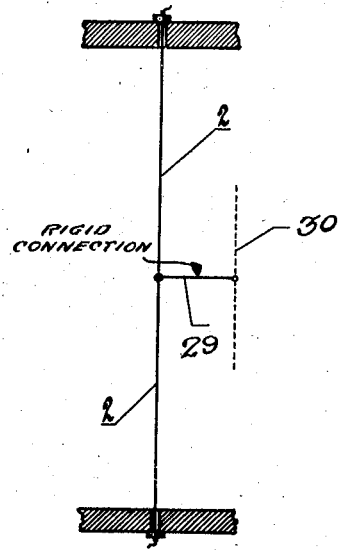

It is also possible to mechanically fix a point of the body 29, attached to the string, as shown in Fig. 4, so that it rotates about a fixed axis 30. The motion of such a body can be observed by any known means, but preferably mirror reading is employed.

By choosing the dimensions of the string and the body properly, it is possible to bring the string in tune with the oscillations used with radiotelegraphy.

I claim:

1. A measuring system for electrical measuring instruments comprising a tensioned string asymmetrically loaded.

2. A measuring system for electrical measuring instruments comprising a tensioned string asymmetrically loaded and adapted to oscillate about a fixed axis laterally spaced therefrom.

3. A measuring system for electrical measuring instruments comprisng a tensioned string and an indicator asymmetrically attached thereto.

4. A measuring system for electrical measuring instruments comprising a tensioned string and an indicator asymmetrically attached thereto and adapted to oscillate about a fixed axis laterally spaced from said string.

5. A measuring system for electrical measuring instruments comprising a tensioned string and an indicator asymmetrically attached thereto and having a portion thereof fixed at a point spaced from said string.

OTTO ARNOLD ANKERSMIT.